3,529,972
PROCESS FOR PREPARING COOKED FOOD PRODUCT
Lee Bertha Sutton, 2541 Wilson Ave., Knoxville, Tenn. 37914
No Drawing. Filed Apr. 10, 1967, Ser. No. 629,394
Int. Cl. A23l 1/31, 1/315
U.S. Cl. 99—107                                 7 Claims

ABSTRACT OF THE DISCLOSURE

Chicken food product using predominantly the wings of the chicken and cooked with other parts of fowl or of meat to form a desired meat product.

BACKGROUND OF THE INVENTION

Various attempts have been made heretofore to provide chicken or fowl in loaf or solid form, but these have been expensive, have required a large amount of labor and were such that the product could not be sold at low cost, Frequently, the keeping quality thereof has been reduced to a minimum or it has required refrigeration which, of course, would add tremendously to the cost of the ultimate product to the consumer.

This is especially true where the product is to be shipped long distances as, for example, overseas. In the worldwide shipment of food there is great need for conserving both space and keeping quality of the product at low cost to reduce the cost of transportation and to provide for the handling of the maximum quantity of usable meat product in the minimum available transporting space.

Chicken is a low cost food, but no satisfactory way has been provided heretofore for preparing the meat so as to fulfill the demand therefor and to allow for its transportation in compact space at low cost. This, however, is made possible by this invention.

SUMMARY OF THE INVENTION

I have discovered that the wings of the chicken contain a glutinous substance which nature provided and which can be utilized to seal the compacted meat product in its combined state. Consequently, the food product comprises essentially 75% by volume of the wings of the chicken as the dominant part of the whole, which also reduces materially the cost of the ultimate product inasmuch as the wings are one of the low cost elements of the chicken.

The other 25% by volume comprises one or more of the other parts of the chicken or other meat products combined. For example, the backs and feet together may comprise the 25%, or these may be combined with a small amount of veal or the gizzards or liver of the chicken.

The parts to be cooked are covered with water and cooked at a temperature of approximately 185° F. for such length of time that the meat falls from the bones and continue the cooking operation until all of the water is completely vaporized, leaving the meat and bones in the container. The bones are then removed. The glutinous substance of the wings will be distributed through the meat so that upon compacting the meat in a solid form as, for example, a load of a roll of the like, this glutinous substance of the wings will cause the meat to adhere together in a solid mass and encase the outside of this mass, preserving the meat for a substantial length of time. It will require very little refrigeration or cooling.

The gizzards can be cooked in a separate container, covered with water, until very soft. Then these should be sliced and combined with the meat mixture. The livers are very delicate and do not require much cooking, but they also may be used and can be blended with the mixture. Adequate seasoning can be incorporated according to taste and mixed in with other substances as found desirable such, for example, as pickles, ketchup, salt, pepper, etc.

If desirable, other meat products may be used for a part of the minor portion of the meat as, for example, veal, turkey, goose or duck.

If these or the richer portions of the chicken or turkey are used, however, they will add considerably to the cost of the ultimate product, whereas by using the less expensive portions of the chicken, such as the wings, the feet and backs, a product of very low cost can be prepared which is highly edible and of good keeping quality.

The glutinous substance of the wings, when cool, forms a jelly-like substance which causes the particles of meat to adhere to each other within the solid mass, as well as forming a casing therearound. It is tasty and readily edible without introducing foreign taste to the chicken product, but retains the chicken taste thereto. It is present in sufficient quantity in this volume so as not to require any foreign substance.

Chicken, turkey, duck and goose food product using predominantly the wings of the fowls and cooked with other parts of poultry or of veal may be used to form a desired meat product.

Adequate seasoning can be incorporated according to taste. Vinegar is one of the outstanding seasonings. Enough vinegar should be added so as to taste the sourness of the product. Other substances are mixed as found desirable such, for example, as pickle, ketchup, salt, pepper and sage.

The following are some of the advantages of this product:

(1) It can be made into sandwiches for use or for placing in a dispensing machine.
(2) It can be smoked.
(3) It can be packed in cans.
(4) It can be made into a salad.

This food product can be formed in various shapes and characters as, for example, it can be molded or placed in a plastic container or tube, or it can be used in other ways.

While the invention has been described in one embodiment, it is recognized that variations and changes may be made therein without departing from the invention as set forth in the claims.

I claim:
1. A method of preparing a food product comprising cooking in water seventy-five percent by volume of chicken wings and twenty-five percent by volume of other meat products to a temperature of approximately 185° F. for such length of time as substantially all of the water has been completely vaporized and the meat separates from the bones and releases the glutinous substance of the wings, compacting the wings separated from the bones thereof and meat product in a solid form adhering together and enclosed by the glutinous substance of the wings.

2. A method of preparing a food product comprising cooking in water fowl wings to a temperature and for a sufficient length of time until the water has been substantially completely vaporized, and to separate the meat from the bones and to release the glutinous substance of the wings, combining and compacting the cooked wings with another cooked meat product, and enclosing the combined wings and meat product within the glutinous substance of the wings.

3. A method of preparing a food product according to claim 2, wherein the wings comprise approximately seventy-five percent by volume, and the meat product comprises approximately twenty-five percent by volume.

4. A method of preparing a food product according to claim 2, wherein the fowl wings are of chicken, and the meat product comprises cooked chicken parts.

5. A method of preparing a food product according to claim 2, including combining with the cooked wings and meat product adequate seasoning to desired taste.

6. A method of preparing a food product according to claim 2, including making the food product into a sandwich for use.

7. A method of preparing a food product according to claim 2, including molding the resulting food product to a desired shape for use.

References Cited

UNITED STATES PATENTS

| | | | |
|---|---|---|---|
| 3,300,317 | 1/1967 | Franklin | 99—107 |
| 2,799,584 | 7/1957 | Robertson | 99—107 |
| 2,851,362 | 9/1958 | Goldberg | 99—107 |
| 2,992,924 | 7/1961 | Kelly | 99—107 |
| 3,057,006 | 10/1962 | Cutrera. | |
| 3,173,795 | 3/1965 | Torr. | |

OTHER REFERENCES

Montagne: "Larousse Gastronomique," 1961, published by Crown Publishers, Inc., New York, p. 739, article entitled Pinion or Poultry Wing.

MAURICE W. GREENSTEIN, Primary Examiner